(12) United States Patent
Hori et al.

(10) Patent No.: US 9,959,642 B2
(45) Date of Patent: May 1, 2018

(54) GRAPH GENERATION APPARATUS, GRAPH DISPLAY APPARATUS, GRAPH GENERATION PROGRAM, AND GRAPH DISPLAY PROGRAM

(71) Applicant: MITSUBISHI ELECTRIC CORPORATION, Tokyo (JP)

(72) Inventors: Atsushi Hori, Tokyo (JP); Daisuke Kisara, Tokyo (JP); Kentaro Mori, Tokyo (JP); Yuichi Okano, Tokyo (JP); Kageyasu Miyahara, Tokyo (JP); Masayuki Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 15/028,754

(22) PCT Filed: Sep. 25, 2014

(86) PCT No.: PCT/JP2014/075430
§ 371 (c)(1),
(2) Date: Apr. 12, 2016

(87) PCT Pub. No.: WO2015/093120
PCT Pub. Date: Jun. 25, 2015

(65) Prior Publication Data
US 2016/0267692 A1 Sep. 15, 2016

(30) Foreign Application Priority Data

Dec. 19, 2013 (JP) .................................. 2013-262615

(51) Int. Cl.
*G06T 11/20* (2006.01)
*G06T 11/00* (2006.01)
*G01D 7/10* (2006.01)

(52) U.S. Cl.
CPC .............. *G06T 11/206* (2013.01); *G01D 7/10* (2013.01); *G06T 11/001* (2013.01); *G06T 2210/62* (2013.01)

(58) Field of Classification Search
CPC combination set(s) only.
See application file for complete search history.

(56) References Cited

U.S. PATENT DOCUMENTS

| 5,999,162 | A | 12/1999 | Takahashi et al. |
| 2002/0169764 | A1 | 11/2002 | Kincaid et al. |

(Continued)

FOREIGN PATENT DOCUMENTS

| JP | 2-310593 A | 12/1990 |
| JP | 7-140010 A | 6/1995 |

(Continued)

*Primary Examiner* — Wesner Sajous
(74) *Attorney, Agent, or Firm* — Birch, Stewart, Kolasch & Birch, LLP (57) ABSTRACT

A vector data selection unit selects, from a vector file of a past line graph, each vector data of a time period where a new line graph overlaps. An attribute value setting unit sets, of the vector data selected, a high transparency degree value to oldest vector data, sets a low transparency degree value to newest vector data, and sets an intermediate transparency degree value to intermediate vector data. A graph display unit displays a portion of a time period of the past line graph where the new line graph overlaps, with a gradation.

10 Claims, 7 Drawing Sheets

(56) References Cited

U.S. PATENT DOCUMENTS

| | | |
|---|---|---|
| 2002/0178184 A1 | 11/2002 | Kuchinsky et al. |
| 2002/0178185 A1 | 11/2002 | Kuchinsky et al. |
| 2003/0218634 A1 | 11/2003 | Kuchinsky et al. |
| 2003/0220747 A1 | 11/2003 | Vailaya et al. |
| 2003/0220895 A1 | 11/2003 | Vailaya |
| 2003/0220910 A1 | 11/2003 | Kincaid |
| 2004/0027350 A1 | 2/2004 | Kincaid et al. |
| 2004/0061702 A1 | 4/2004 | Kincaid |
| 2004/0241730 A1 | 12/2004 | Yakhini et al. |
| 2005/0027729 A1 | 2/2005 | Kuchinsky et al. |
| 2005/0038770 A1 | 2/2005 | Kuchinsky et al. |
| 2005/0039123 A1 | 2/2005 | Kuchinsky et al. |
| 2005/0112689 A1 | 5/2005 | Kincaid |
| 2005/0188294 A1 | 8/2005 | Kuchinsky et al. |
| 2005/0197783 A1 | 9/2005 | Kuchinsky et al. |
| 2005/0206644 A1 | 9/2005 | Kincaid |
| 2005/0216459 A1 | 9/2005 | Vailaya et al. |
| 2005/0278321 A1 | 12/2005 | Vailaya et al. |
| 2006/0028471 A1 | 2/2006 | Kincaid et al. |
| 2007/0174019 A1 | 7/2007 | Vailaya et al. |
| 2008/0126408 A1* | 5/2008 | Middleton ........ G06F 17/30548 |
| 2008/0273036 A1 | 11/2008 | Kishimoto et al. |
| 2009/0006226 A1* | 1/2009 | Crowder ................ G06Q 10/06 705/30 |
| 2010/0281366 A1* | 11/2010 | Langmacher ....... G06F 3/04845 715/716 |
| 2014/0229229 A1* | 8/2014 | Hirate .................... G06Q 10/00 705/7.29 |

FOREIGN PATENT DOCUMENTS

| | | |
|---|---|---|
| JP | 7-234133 A | 9/1995 |
| JP | 9-146629 A | 6/1997 |
| JP | 10-154056 A | 6/1998 |
| JP | 2000-352528 A | 12/2000 |
| JP | 2006-139762 A | 6/2006 |
| JP | 2007-033071 A | 2/2007 |
| JP | 2008-249674 A | 10/2008 |
| JP | 2011-065500 A | 3/2011 |
| JP | 2012-226731 A | 11/2012 |

* cited by examiner

291: NUMERICAL VALUE FILE

| ID | DATE AND TIME | NUMERICAL VALUE |
|---|---|---|
| 1 | 2013/12/19 0:00:00 | Q1 |
| 2 | 2013/12/19 0:10:00 | Q2 |
| : | : | : |

101: NUMERICAL VALUE DATA

Fig. 6

292: VECTOR FILE

| ID | COORDINATE VALUE | COLOR VALUE | $\alpha$ VALUE | WEIGHT VALUE | LINE TYPE VALUE |
|---|---|---|---|---|---|
| 1 | X1, Y1 | C1 | $\alpha 1$ | T1 | M1 |
| 2 | X2, Y2 | C2 | $\alpha 2$ | T2 | M2 |
| : | : | : | : | : | : |

102: VECTOR DATA

GRAPH GENERATION APPARATUS, GRAPH DISPLAY APPARATUS, GRAPH GENERATION PROGRAM, AND GRAPH DISPLAY PROGRAM

TECHNICAL FIELD

The present invention relates to technology that generates a line graph (for example, a trend graph).

BACKGROUND ART

A conventional trend graph display apparatus displays a measured value of a most recent 24 hours along a time axis from 0 o'clock to 24 o'clock in a line graph. The trend graph display apparatus displays a current position line at a graph point that indicates a current measured value, and a blank space is provided between a current graph point and a graph point of 24 hours ago. The current position line and the blank space facilitate easier recognition of a change in the measured value of the most recent 24 hours (Patent Literature 1).

With the conventional technology, however, a change in a measured value before the most recent 24 hours is unable to be recognized. For example, when current time is 12 o'clock, a measured value from 0 o'clock to 12 o'clock of a day before is unable to be recognized with the conventional technology. Therefore, it is difficult to compare the change in the measured value of the day before with the change in the measured value of the current day.

CITATION LIST

Patent Literature

Patent Literature 1: JP2007-033071 A

SUMMARY OF INVENTION

Technical Problem

The present invention aims to make easier a comparison between a new line graph (for example, a trend graph of the current day) and a past line graph (for example, a trend graph of a day before).

Solution to Problem

A graph generation apparatus includes:
a graph point group data storage unit to store past graph point group data that represents, in chronological order, a plurality of graph points included in a past line graph, and new graph point group data that represents, in chronological order, a plurality of graph points included in a new line graph;
an overlapping-portion data selection unit to select, as overlapping-portion data, graph point group data which represents a plurality of graph points included in an overlapping-portion graph, the overlapping-portion graph being a line graph of a time period of the past line graph where the new line graph overlaps, from the past graph point group data; and
a graph image data generation unit to generate graph image data that represents, as the overlapping-portion graph, a line graph in which a display style of the overlapping-portion data gradually changes along a time axis.

Advantageous Effects of Invention

According to the present invention, a line graph of a time period of a past line graph where a new line graph overlaps (an overlapping-portion graph) is possible to be displayed in a display style such that there is a gradual change along a time axis.

According to the above, comparison between the new line graph and the past line graph is made easier.

DESCRIPTION OF EMBODIMENTS

Embodiment 1

An embodiment which makes easier a comparison between a new trend graph and a past trend graph will be described.

Figure 1:
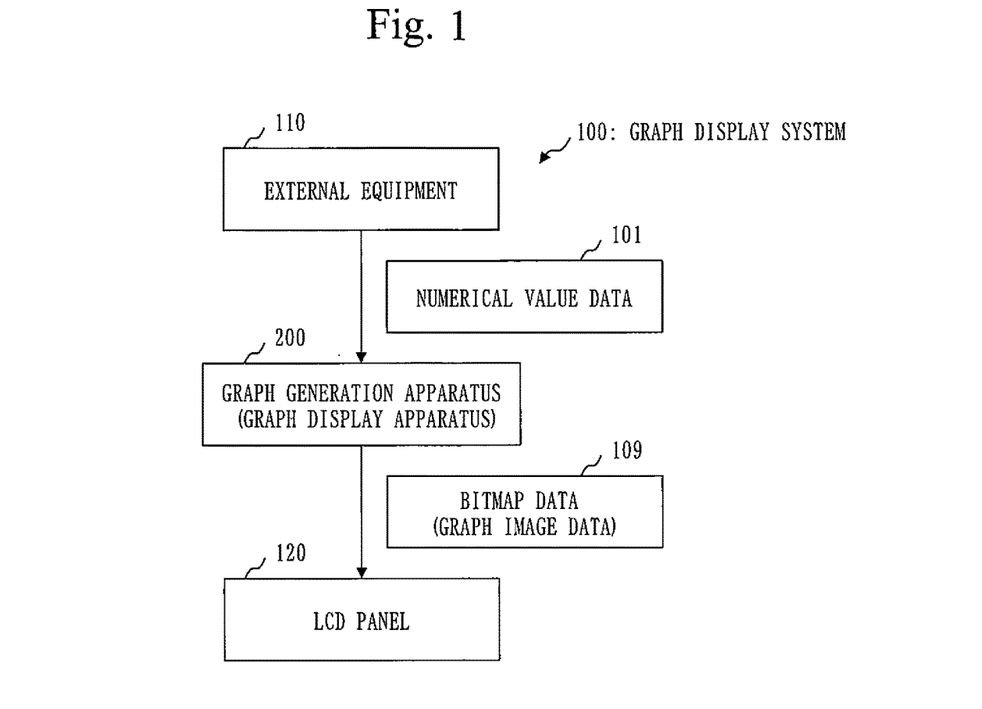
FIG. 1 is a configuration diagram of a graph display system 100 according to a first embodiment.

FIG. 1 is a configuration diagram of a graph display system 100 according to a first embodiment.

A configuration of the graph display system 100 according to the first embodiment will be described based on FIG. 1.

The graph display system 100 is a system that displays a trend graph (an example of a line graph) in which graph points that represent measured values are connected by a line in an order of time.

The graph display system 100 includes external equipment 110, a graph generation apparatus 200, and an LCD panel 120.

The external equipment 110 outputs numerical value data 101 which represents a numerical value such as temperature, a power value, and number of items sold. For example, the external equipment 110 is a sensor or measuring equipment that measures a numerical value.

The graph generation apparatus 200 (an example of a graph display apparatus) generates bitmap data 109 (an example of graph image data), which is image data of the trend graph, based on a plurality of numerical value data 101.

The LCD panel 120 displays an image of the trend graph based on the bitmap data 109. The LCD panel 120 is an example of a display apparatus and a different type of display apparatus than the LCD panel 120 may be used.

The graph generation apparatus 200 communicates with the external equipment 110 wiredly or wirelessly. The graph generation apparatus 200 may communicate with the external equipment 110 via a relay apparatus (a communication apparatus).

The LCD panel 120 is connected to the graph generation apparatus 200 via a video cable. The graph generation apparatus 200, however, may be an apparatus that includes an LCD panel 120 such as a notebook computer.

Figure 2:
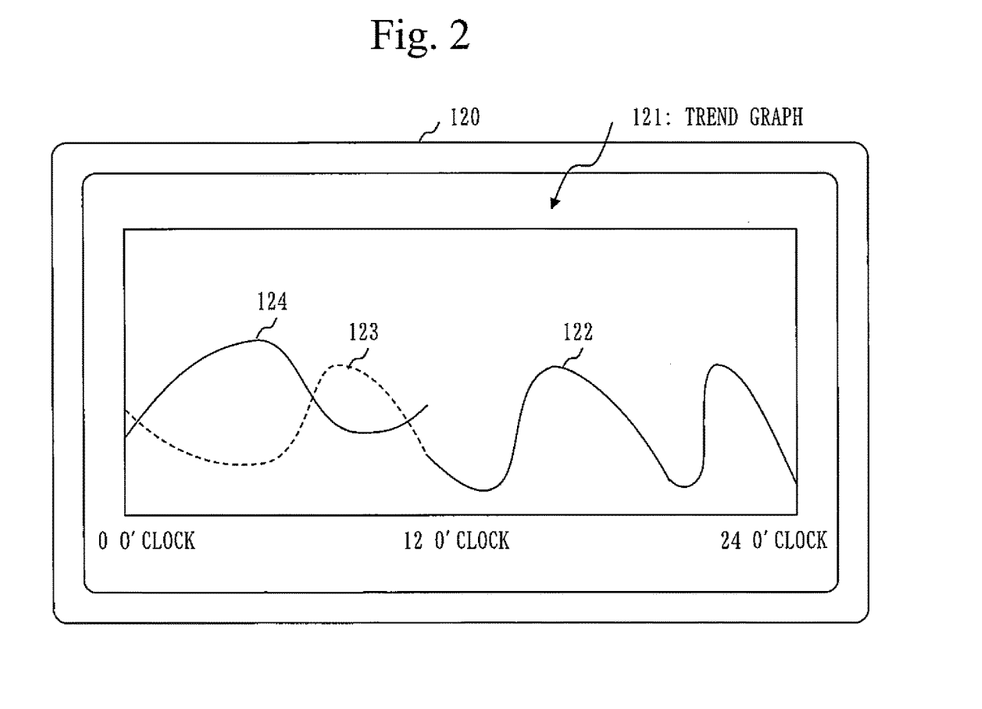
FIG. 2 is a diagram illustrating an example of a trend graph 121 according to the first embodiment.

FIG. 2 is a diagram illustrating an example of a trend graph 121 according to the first embodiment.

An example of the trend graph 121 according to the first embodiment will be described based on FIG. 2.

The LCD panel 120 displays the trend graph 121 as illustrated in FIG. 2. A horizontal axis of the trend graph 121 is a time axis that represents time (from 0 o'clock to 24 o'clock), and a vertical axis of the trend graph 121 is a numerical value axis that represents a numerical value.

The trend graph 121 includes an old graph 122 (an example of a past line graph) which is a graph of 0 o'clock to 24 o'clock of a day before, and a new graph 124 (an example of a new line graph) which is a graph of 0 o'clock and onward of a current day. A numerical value represented by the new graph 124 is of the same type as the type of numerical value represented by the old graph 122.

The old graph 122 includes a gradation portion 123 (an example of an overlapping-portion graph). The gradation portion 123 is a portion of a time period of the old graph 122 where the new graph 124 overlaps. The portion of the time period that overlaps is a time period in a first part of a term (one day) expressed by a fixed length of time (24 hours).

The gradation portion 123 is displayed with a gradation. In other words, in the gradation portion 123, each of transparency rate, shade, weight, type, and the like gradually changes along the time axis. For example, the gradation portion 123 is light in color when approaching 0 o'clock and dark in color when approaching 24 o'clock.

The trend graph 121 may be a graph as described below.

The direction of the time axis may be from right to left, top to bottom, or bottom to top, and not left to right.

The old graph 122 and the new graph 124 may not be graphs of one day. For example, the old graph 122 and the new graph 124 may be a graph of one hour, a graph of half of a day (A.M. and P.M.), a graph of one month, or a graph of one year.

The gradation portion 123 may be a part of the time period of the old graph 122 where the new graph 124 overlaps.

Figure 3:
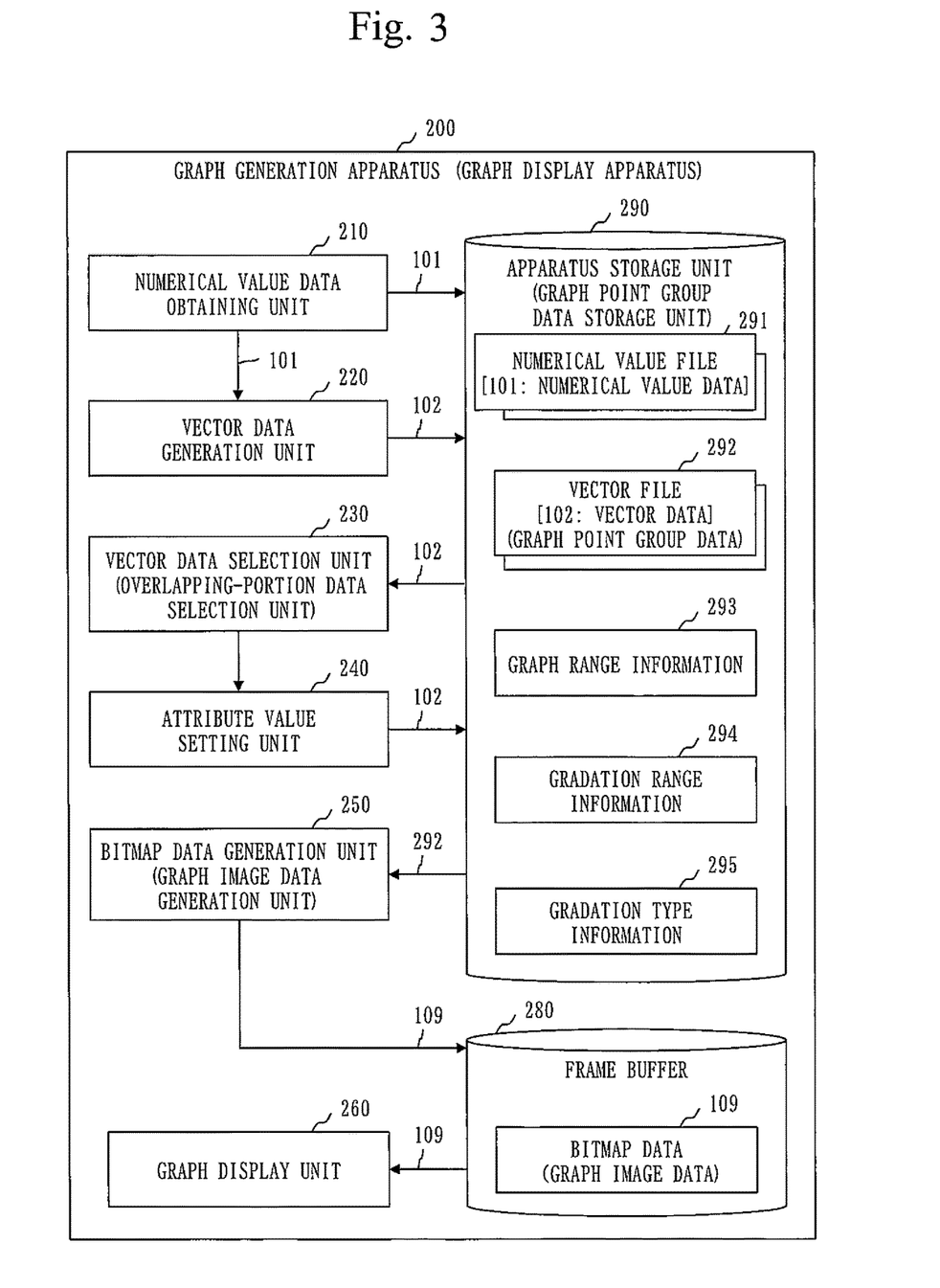
FIG. 3 is a functional configuration diagram of a graph generation apparatus 200 according to the first embodiment.

FIG. 3 is a functional configuration diagram of the graph generation apparatus 200 according to the first embodiment.

The functional configuration of the graph generation apparatus 200 according to the first embodiment will be described based on FIG. 3.

The graph generation apparatus 200 (an example of the graph display apparatus) is an apparatus that generates bitmap data 109 (an example of the graph image data) of the trend graph 121.

The graph generation apparatus 200 includes a numerical value data obtaining unit 210, a vector data generation unit 220, a vector data selection unit 230 (an example of an overlapping-portion data selection unit), an attribute value setting unit 240, a bitmap data generation unit 250 (an example of a graph image data generation unit), and a graph display unit 260.

Furthermore, the graph generation apparatus 200 includes a frame buffer 280 and an apparatus storage unit 290 (an example of a graph point group data storage unit).

The numerical value data obtaining unit 210 obtains new numerical value data 101 outputted from the external equipment 110, and adds the new numerical value data 101 to a numerical value file 291 of the new graph 124.

The numerical value file 291 is a file which includes a piece or more than a piece of numerical value data 101.

The vector data generation unit 220 generates new vector data 102 based on the new numerical value data 101, and adds the new vector data 102 to a vector file 292 (an example of new graph point group data) of the new graph 124.

Vector data 102 (an example of graph point data) is data that includes a coordinate value which indicates a position of a graph point which represents the numerical value data 101, and an attribute value that represents an attribute of the graph point which represents the numerical value data 101. For example, the vector data 102 includes the attribute values such as a color value which represents a color of the graph point, an alpha value that represents a transparency degree of the graph point, a weight value which represents weight of a line segment having the graph points as endpoints, and a line type value which represents a type of a line segment having the graph point as the endpoint.

The vector file 292 (an example of graph point group data) is a file which includes a piece or more than a piece of vector data 102.

The vector data selection unit 230 selects each vector data 102 of a plurality of graph points included in the gradation portion 123 from a vector file 292 (an example of past graph point group data) of the old graph 122.

The gradation portion 123 is the portion of the time period of the old graph 122 where the new graph 124 overlaps. The portion of the time period that overlaps is a portion of a time period of a term (one day) expressed by a fixed length of time (24 hours).

The attribute value setting unit 240 sets an attribute value for a gradation to each vector data 102 of the plurality of graph points included in the gradation portion 123.

For example, the attribute value for the gradation is transparency rate, shade, weight, type, and the like. Each of transparency rate, shade, weight, type, and the like of the gradation portion 123 gradually changes along the time axis according to a setting of the attribute value for the gradation.

The bitmap data generation unit 250 generates the bitmap data 109 of the trend graph 121 based on the vector file 292 of the old graph 122 and the vector file 292 of the new graph 124. The bitmap data generation unit 250 stores the bitmap data 109 of the trend graph 121 in the frame buffer 280.

The graph display unit 260 displays the trend graph 121 on the LCD panel 120 using the bitmap data 109 stored in the frame buffer 280.

The frame buffer 280 stores the bitmap data 109.

The apparatus storage unit 290 stores the data that the graph generation apparatus 200 uses, generates, receives, or outputs.

For example, the apparatus storage unit 290 stores the numerical value file 291, the vector file 292, graph range information 293, gradation range information 294, and gradation type information 295.

The graph range information 293 is data of information that specifies terms of the old graph 122 and the new graph 124 included in the trend graph 121. For example, when the graph range information 293 specifies one day, the graph of the day before is the old graph 122, and the graph of the current day is the new graph 124.

The gradation range information 294 is data of information that specifies a range (a gradation range) of the gradation portion 123 of the trend graph 121. For example, the gradation range information 294 specifies, as the gradation range, a portion of the same time period as the time period of the new graph 124 on the old graph 122.

The gradation type information 295 is data of information that specifies a gradation type. For example, the gradation type information 295 specifies a change in transparency degree (degree of clearness), a change in shade, a change in line segment weight, a change in line segment type, and the like as the gradation type. The change in transparency degree, shade, line segment weight, or line segment type is an example of a display style of a graph.

Figure 4:
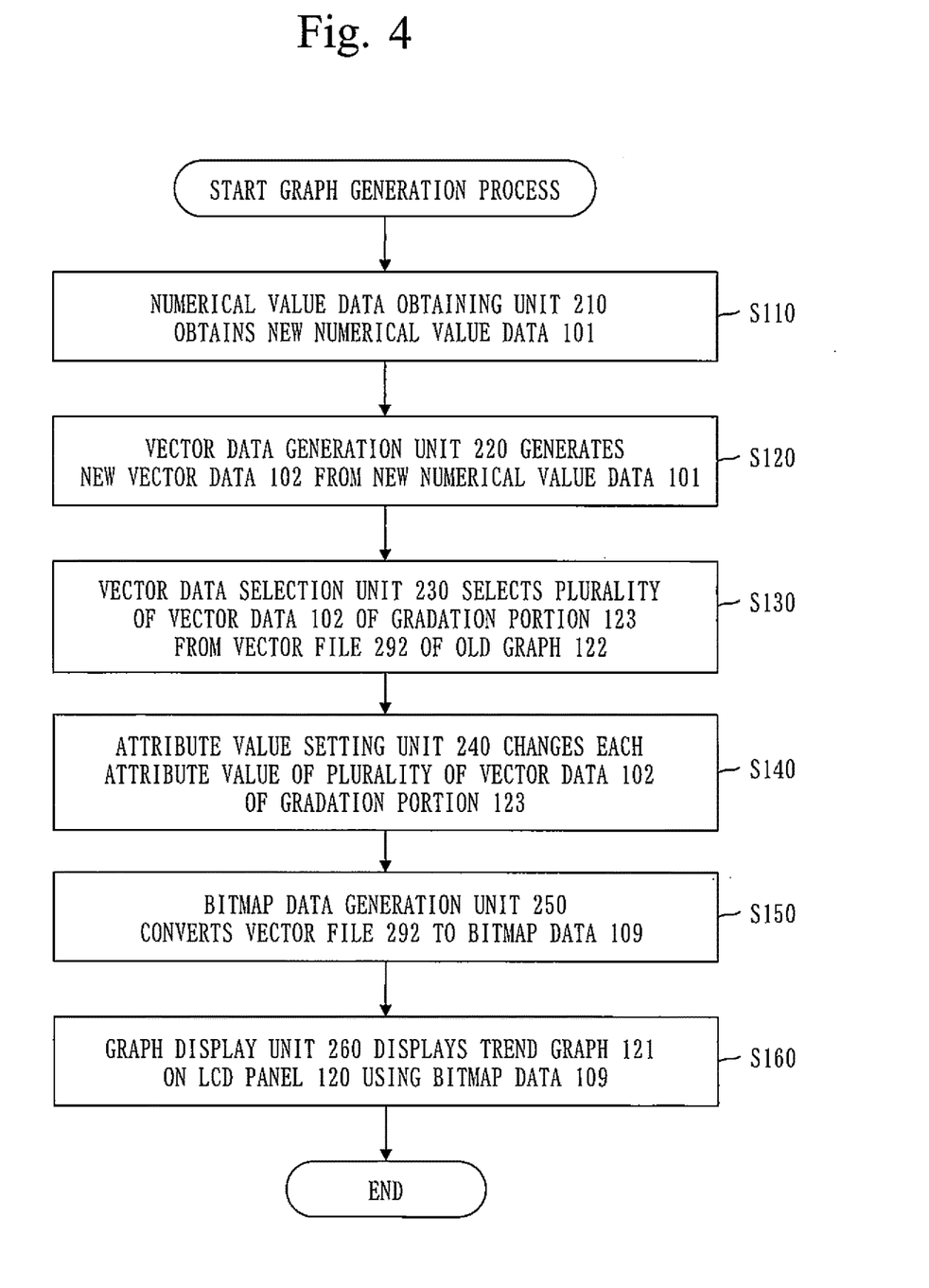
FIG. 4 is a flowchart illustrating a graph generation method of the graph generation apparatus 200 according to the first embodiment.

FIG. 4 is a flowchart illustrating a graph generation process of the graph generation apparatus 200 according to the first embodiment.

The graph generation process of the graph generation apparatus 200 according to the first embodiment will be described based on FIG. 4.

The graph generation process is executed every time the external equipment 110 outputs the new numerical value data 101.

At S110, the numerical value data obtaining unit 210 obtains the new numerical value data 101, and adds the new numerical value data 101 obtained to the numerical value file 291 of the new graph 124.

If, however, a date and time included in the new numerical value data 101 are the date and time (for example, December 2) past the term (for example, December 1) of the new graph 124, the numerical value data obtaining unit 210 saves the numerical value file 291 of the new graph 124 (December 1) as a numerical value file 291 of the old graph 122. Then, the numerical value data obtaining unit 210 newly generates a numerical value file 291 of the new graph 124 (December 2), and adds the new numerical value data 101 to the generated numerical value file 291 of the new graph 124.

After S110, the process proceeds to S120.

Figure 5:
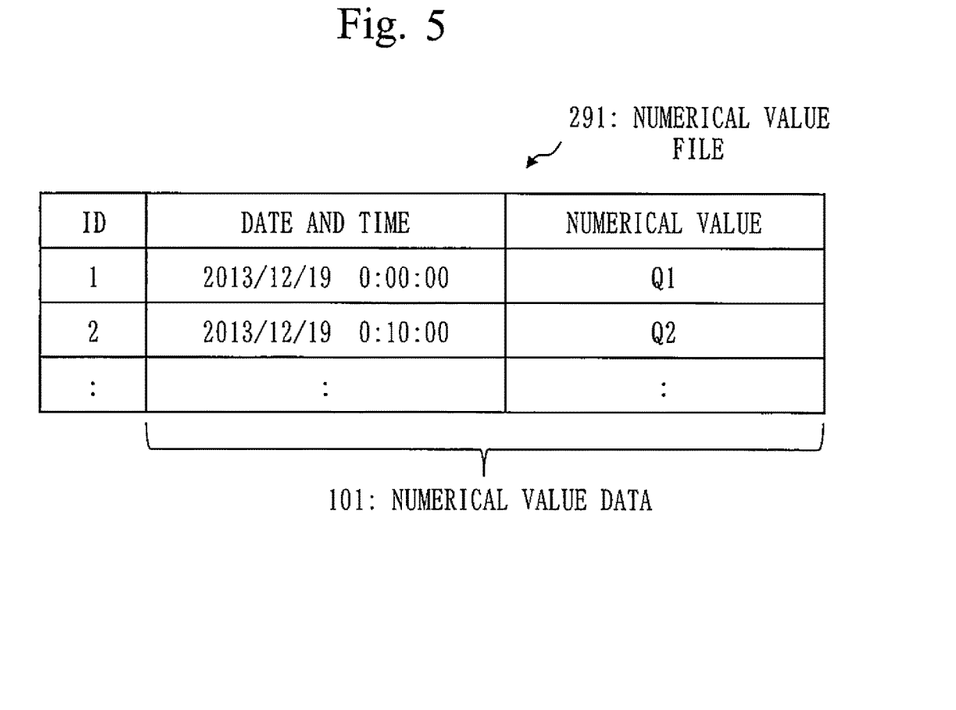
FIG. 5 is a diagram illustrating an example of a numerical value file 291 according to the first embodiment.

FIG. 5 is a diagram illustrating an example of the numerical value file 291 according to the first embodiment.

In FIG. 5, the numerical value file 291 relates an ID which is an identifier that identifies the numerical value data 101, to the numerical value data 101 (such as a date, time, and a numerical value).

Returning to FIG. 4, a description will proceed from S120.

At S120, the vector data generation unit 220 calculates a coordinate value on the time axis based on the date and time included in the new numerical value data 101.

The vector data generation unit 220 calculates a coordinate value on the numerical value axis based on a numerical value included in the new numerical value data 101.

The vector data generation unit 220 generates new vector data 102 which includes the coordinate value on the time axis calculated, the coordinate value on the numerical value axis calculated, and an initial value of the attribute value. The initial value of the attribute value is a value determined by a user in advance.

The vector data generation unit 220 adds the new vector data 102 generated to the vector file 292 of the new graph 124.

If, however, the date and time included in the new numerical value data 101 are the date and time (for example, December 2) past the term (for example, December 1) of the new graph 124, the vector data generation unit 220 saves the vector file 292 of the new graph 124 (December 1) as the vector file 292 of the old graph 122. Then, the vector data generation unit 220 newly generates a vector file 292 of the new graph 124 (December 2), and adds the new vector data 102 to the generated vector file 292 of the new graph 124 (the same as S110).

After S120, the process proceeds to S130.

Figure 6:
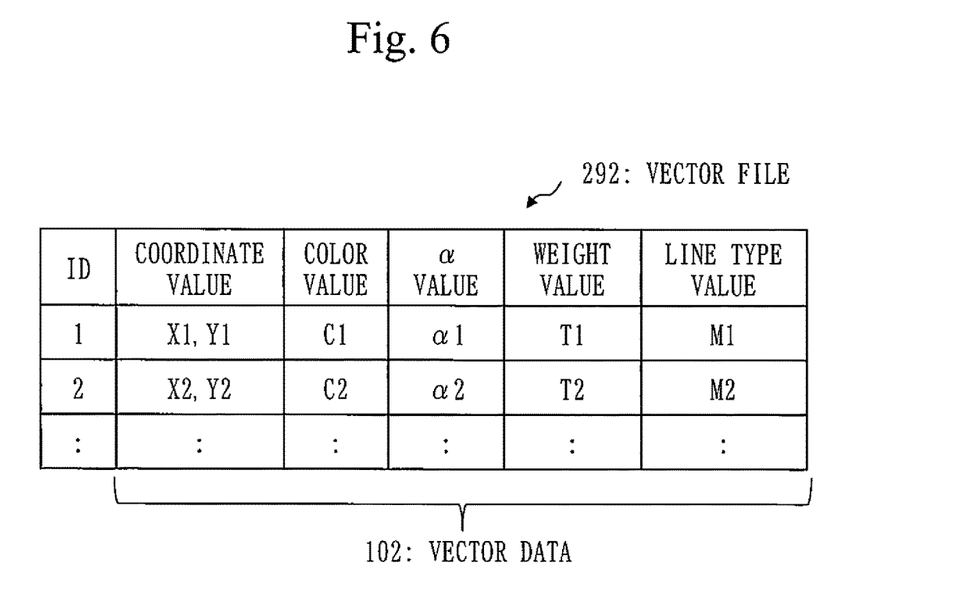
FIG. 6 is a diagram illustrating an example of a vector file 292 according to the first embodiment.

FIG. 6 is a diagram illustrating an example of the vector file 292 according to the first embodiment.

In FIG. 6, the vector file 292 relates an ID which is an identifier that identifies the vector data 102 (and the numerical value data 101), to the vector data 102 (such as a coordinate value, a color value, an a value, a weight value, and a line type value).

The coordinate value included in the vector data 102 indicates the position of the graph point representing the numerical value data 101 which is a source of the vector data 102.

The color value, the a value (the alpha value), the weight value, and the line type value included in the vector data 102 are examples of the attribute value to be changed for drawing the gradation portion 123.

The color value represents a shade of a graph point or a shade of a line segment to a next graph point.

The alpha value represents the transparency degree of the graph point, or a transparency degree of a line segment that connects adjacent graph points.

The weight value represents a weight of the line segment that connects the adjacent graph points.

The line type value represents a type (such as a solid line, a dotted line, a wavy line, or texture) of the line segment that connects the adjacent graph points.

Returning to FIG. 4, a description will proceed from S130.

At S130, the vector data selection unit 230 selects a plurality of vector data 102 that represents a plurality of graph points to be included in the gradation portion 123 from the vector file 292 of the old graph 122, based on the gradation range information 294.

If, however, the vector file 292 of the old graph 122 does not yet exist, the vector data selection unit 230 does not need to execute S130.

Hereinafter, the plurality of vector data 102 to be selected at S130 will be mentioned as a plurality of vector data 102 of the gradation portion 123.

For example, the gradation range information 294 specifies the time period portion of the old graph 122 where the new graph 124 overlaps as the gradation portion 123. In this case, the vector data selection unit 230 selects the plurality of vector data 102 of the gradation portion 123 in a way described hereinafter.

First, the vector data selection unit 230 determines a time period of the new graph 124 based on the numerical value file 291 of the new graph 124. The time period of the new graph 124 is a time period from a date and time included in the numerical value data 101 at a first date and time of the new graph 124, to a date and time included in the numerical value data 101 at a last date and time of the new graph 124.

Next, the vector data selection unit 230 selects the plurality of numerical value data 101 which includes the dates and time included in the time period of the new graph 124 from the numerical value file 291 of the old graph 122. For example, if the time period of the new graph 124 is a time period from 0 o'clock to 12 o'clock, the vector data selection unit 230 selects the plurality of numerical value data 101 which includes time from 0 o'clock to 12 o'clock.

Then, the vector data selection unit 230 selects, from the vector file 292 of the old graph 122, a plurality of vector data 102 generated based on the plurality of numerical value data 101 selected. The plurality of vector data 102 selected is the plurality of vector data 102 of the gradation portion 123. The vector data 102 generated based on the numerical value data 101 is the vector data 102 that is related to the same ID as that of the numerical value data 101.

After S130, the process proceeds to S140.

At S140, the attribute value setting unit 240 changes each attribute value of the plurality of vector data 102 of the gradation portion 123 based on the gradation type information 295. In other words, the attribute value setting unit 240 sets an attribute value for a gradation to each of the plurality of vector data 102 of the gradation portion 123.

If, however, the plurality of vector data 102 of the gradation portion 123 is not selected at S130, the attribute value setting unit 240 does not need to execute S140.

After S140, the process proceeds to S150.

Figure 7:
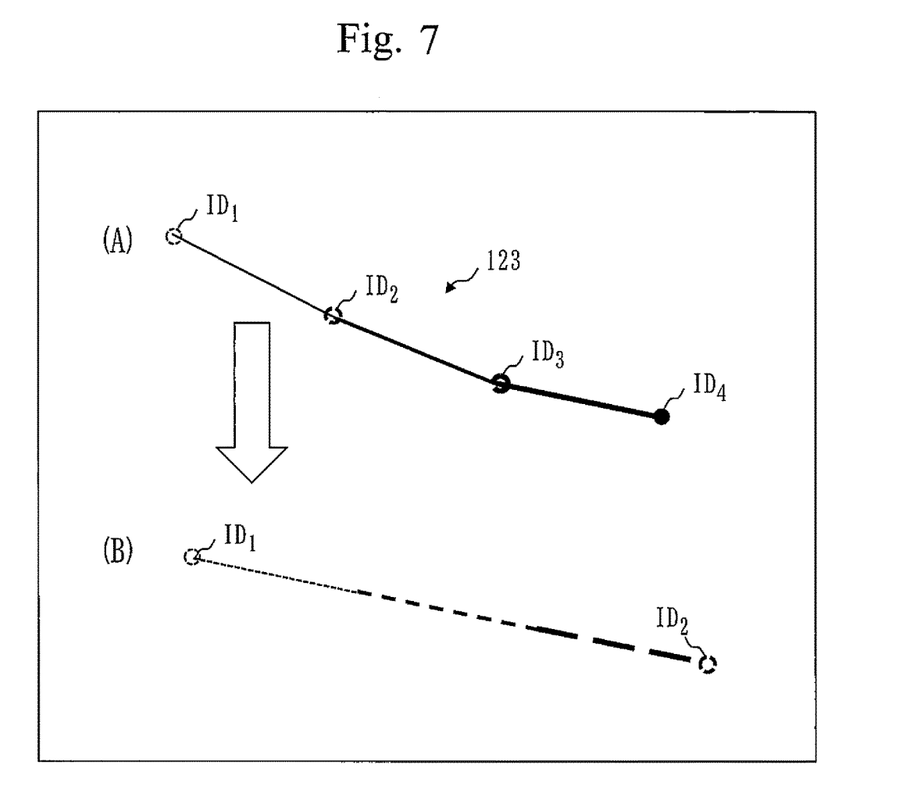
FIG. 7 is an outlining diagram of a graph of a gradation portion 123 according to the first embodiment.

FIG. 7 is an outlining diagram of the gradation portion 123 according to the first embodiment.

The gradation portion 123 according to the first embodiment will be described based on FIG. 7.

(A) of FIG. 7 illustrates the gradation portion 123 where four graph points that represent vector data 102 of $ID_1$ to $ID_4$ are connected by a line. Differences in line types in the diagram represent the gradation.

(B) of FIG. 7 is an enlarged diagram of a line segment from graph point of $ID_1$ to graph point of $ID_2$. Differences in line types in the diagram represent the gradation.

For example, the attribute value setting unit 240 changes an attribute value of the vector data 102 of $ID_1$ to $ID_4$ in a way as described hereinafter.

If the gradation type specified by the gradation type information 295 is transparency degree, the attribute value setting unit 240 changes an alpha value of oldest vector data $ID_1$ (the vector data 102 at a first time point) to a value which signifies complete transparency (clearness). As a result, the graph point of $ID_1$ becomes transparent and merges with a background. The attribute value setting unit 240, however, may change an alpha value of the vector data $ID_1$ to a value which signifies a transparency degree that is nearly clear (high transparency degree).

On the other hand, the attribute value setting unit 240 does not change an alpha value of newest vector data $ID_4$ (the vector data 102 at a last time point). As a result, the graph point of $ID_4$ will be a regular graph point with no transparency. The attribute value setting unit 240, however, may change the alpha value of the vector data $ID_4$ to a value which signifies a transparency degree that is close to a regular graph point (low transparency degree).

The attribute value setting unit 240 changes alpha values of the vector data $ID_2$ and $ID_3$ in between to values which signify translucency. As a result, the graph point of $ID_2$ and the graph point of $ID_3$ will be translucent. The higher the transparency degree, the clearer the graph point becomes.

The gradation portion 123 includes three line segments that connect the four graph points.

The graph point of $ID_2$ is a second graph point when counting from the graph point of $ID_4$. Therefore, the attribute value setting unit 240 changes an alpha value of the vector data $ID_2$ to a value which signifies two thirds of the transparency degree. The attribute value setting unit 240, however, may set the alpha value of the vector data $ID_2$ to a value which signifies the transparency degree other than the two thirds.

The graph point of $ID_3$ is a first graph point when counting from the graph point of $ID_4$. Therefore, the attribute value setting unit 240 changes an alpha value of the vector data $ID_3$ to a value which signifies one third of the transparency degree. The attribute value setting unit 240, however, may set the alpha value of the vector data $ID_3$ to a value which signifies the transparency degree other than the one third.

Each line segment included in the gradation portion 123 is displayed with a gradation. For example, in (B) of FIG. 7, the graph point of $ID_1$ is clear, the graph point of $ID_2$ is at two thirds of the transparency degree, and the line segment that connects the graph point of $ID_1$ and the graph point of $ID_2$ becomes higher in transparency degree as it approaches the graph point of $ID_1$. In other words, the gradation portion 123 becomes lighter as it approaches the graph point of $ID_1$ from the graph point of $ID_4$.

Each line segment included in the gradation portion 123, however, may be displayed in a single transparency degree without being displayed with a gradation. In this case, the transparency degree of the line segment is the transparency degree of the graph point at one end of the line segment, or an intermediate value of the transparency degrees of graph points at both ends. For example, the transparency degree of the line segment that connects the graph point of $ID_1$ and the graph point of $ID_2$ is two thirds as with that of the graph point of $ID_2$, and the transparency degree of the line segment that connects the graph point of $ID_2$ and the graph point of $ID_3$ is one third as with that of the graph point of $ID_3$. In other words, the gradation portion 123 that becomes lighter in every line segment as it approaches the graph point of $ID_1$ from the graph point of $ID_4$ is displayed.

The gradation type information 295 may specify the gradation type other than the transparency degree (such as shade, line weight, and line type).

If the gradation type specified by the gradation type information 295 is shade, the attribute value setting unit 240 changes the color value of each vector data 102 of the gradation portion 123. As a result, the gradation portion 123 that changes in darkness of color or types of color gradually along the time axis is displayed. For example, the gradation portion 123 that changes from a dark color to a light color as it approaches the graph point of $ID_1$ from the graph point of $ID_4$ is displayed. For example, the gradation portion 123 that changes from a first color to a second color as it approaches the graph point of $ID_1$ from the graph point of $ID_4$ is displayed.

If the gradation type specified by the gradation type information 295 is line weight, the attribute value setting unit 240 changes the weight value of each vector data 102 of the gradation portion 123. As a result, the gradation portion 123 that changes in line weight gradually along the time axis is displayed. For example, the gradation portion 123 where the line becomes narrower as it approaches the graph point of $ID_1$ from the graph point of $ID_4$ is displayed.

If the gradation type specified by the gradation type information 295 is line type, the attribute value setting unit 240 changes the line type value of each vector data 102 of the gradation portion 123. As a result, the gradation portion 123 that changes in line type gradually along the time axis is displayed. For example, the gradation portion 123 that changes sequentially from a solid line, to a dash-dotted line, and to a dotted line as it approaches the graph point of $ID_1$ from the graph point of $ID_4$ is displayed. For example, the gradation portion 123 that changes from a line using heavy texture to a line using light texture as it approaches the graph point of $ID_1$ from the graph point of $ID_4$ is displayed.

If the gradation type information 295 is to specify a plurality of gradation types, the attribute value setting unit 240 changes each attribute value of the plurality of types. For example, if the gradation type specified by the gradation type information 295 is the transparency degree and the line weight, the attribute value setting unit 240 changes the alpha value and the weight value of each vector data 102 of the gradation portion 123.

The attribute value setting unit 240 may set the attribute value of each vector data 102 of the gradation portion 123 using gradation information which indicates change patterns of the transparency degree, the shade, the line weight, the line type, or the like. The gradation information is the information determined by the user in advance.

Returning to FIG. 4, a description will proceed from S150.

At S150, the bitmap data generation unit 250 generates the bitmap data 109 of the trend graph 121 based on the vector file 292 of the old graph 122 and the vector file 292 of the new graph 124. The trend graph 121 includes the new graph 124 and the old graph 122, and the old graph 122 includes the gradation portion 123 (refer to FIG. 7).

In other words, the bitmap data generation unit 250 generates bitmap data 109 of each line segment of the gradation portion 123 based on the attribute value included in each vector data 102 of the gradation portion 123. The gradation portion 123 is a line graph in which a display style gradually changes along the time axis.

The bitmap data generation unit 250 may generate the bitmap data 109 of each line segment of the gradation portion 123 by using the gradation information which indicates the change patterns of the transparency degree, the shade, the line weight, the line type, and the like. The gradation information is the information determined by the user in advance.

The bitmap data generation unit 250 stores the bitmap data 109 generated, in the frame buffer 280.

After S150, the process proceeds to S160.

At S160, the graph display unit 260 displays an image of the trend graph 121 on the LCD panel 120 using the bitmap data 109 stored in the frame buffer 280 (refer to FIG. 2).

The graph generation process is completed after S160.

Figure 8:
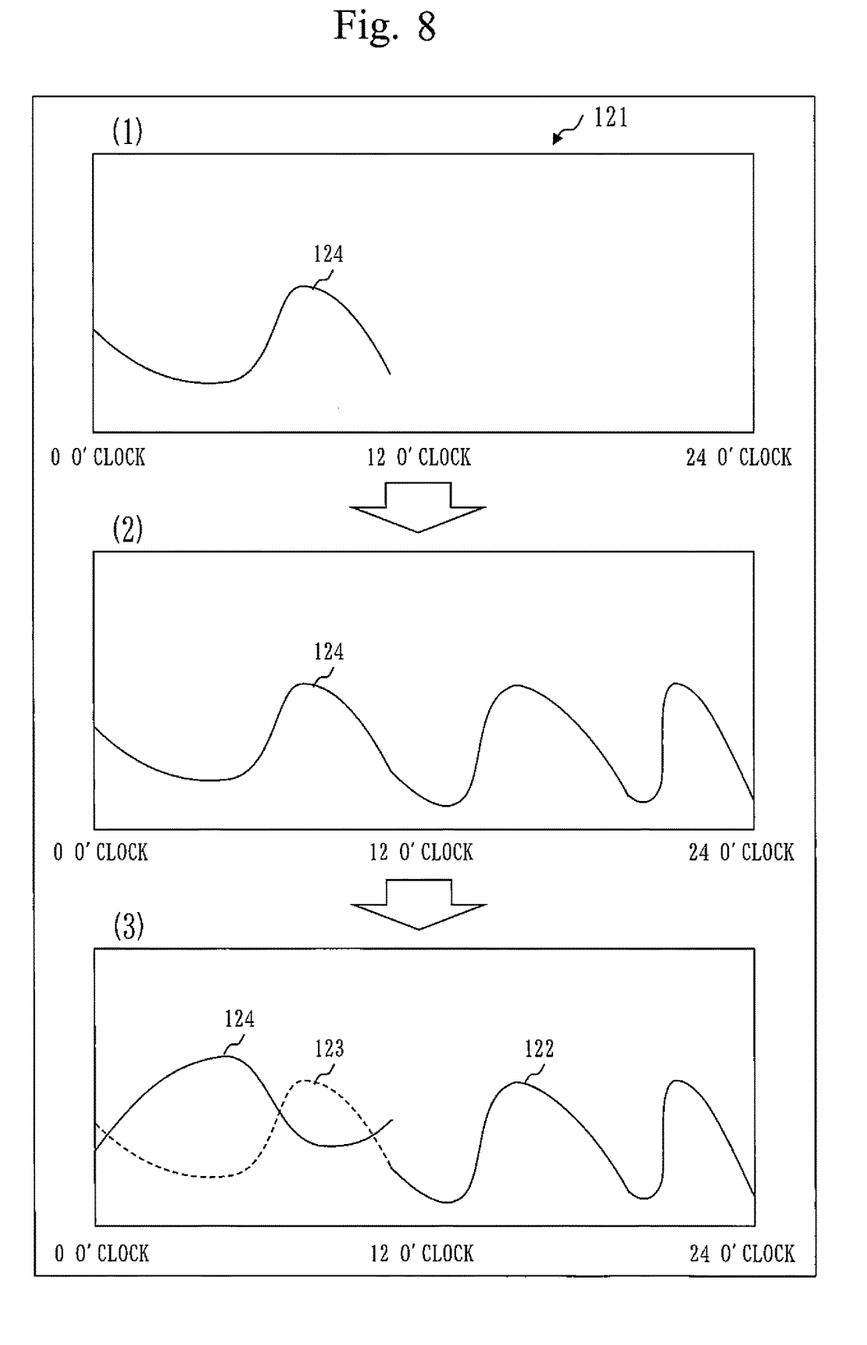
FIG. 8 is a diagram illustrating a display example of the trend graph 121 according to the first embodiment.

FIG. 8 is a diagram illustrating a display example of the trend graph 121 according to the first embodiment.

The trend graph 121 as illustrated in FIG. 8 is displayed by executing the graph generation process (refer to FIG. 4) repeatedly.

At (1) of FIG. 8, the new graph 124 is displayed and the old graph 122 is not displayed when the numerical value data 101 and the vector data 102 of the old graph 122 do not exist.

At (2) of FIG. 8, the new graph 124 reaches the last hour (24 o'clock).

At (3) of FIG. 8, what had been the new graph 124 until now is displayed as the old graph 122, an additional new graph 124 is displayed, and a gradation portion 123 which is a portion of the time period of the old graph 122 where the new graph 124 overlaps is displayed with a gradation.

Figure 9:
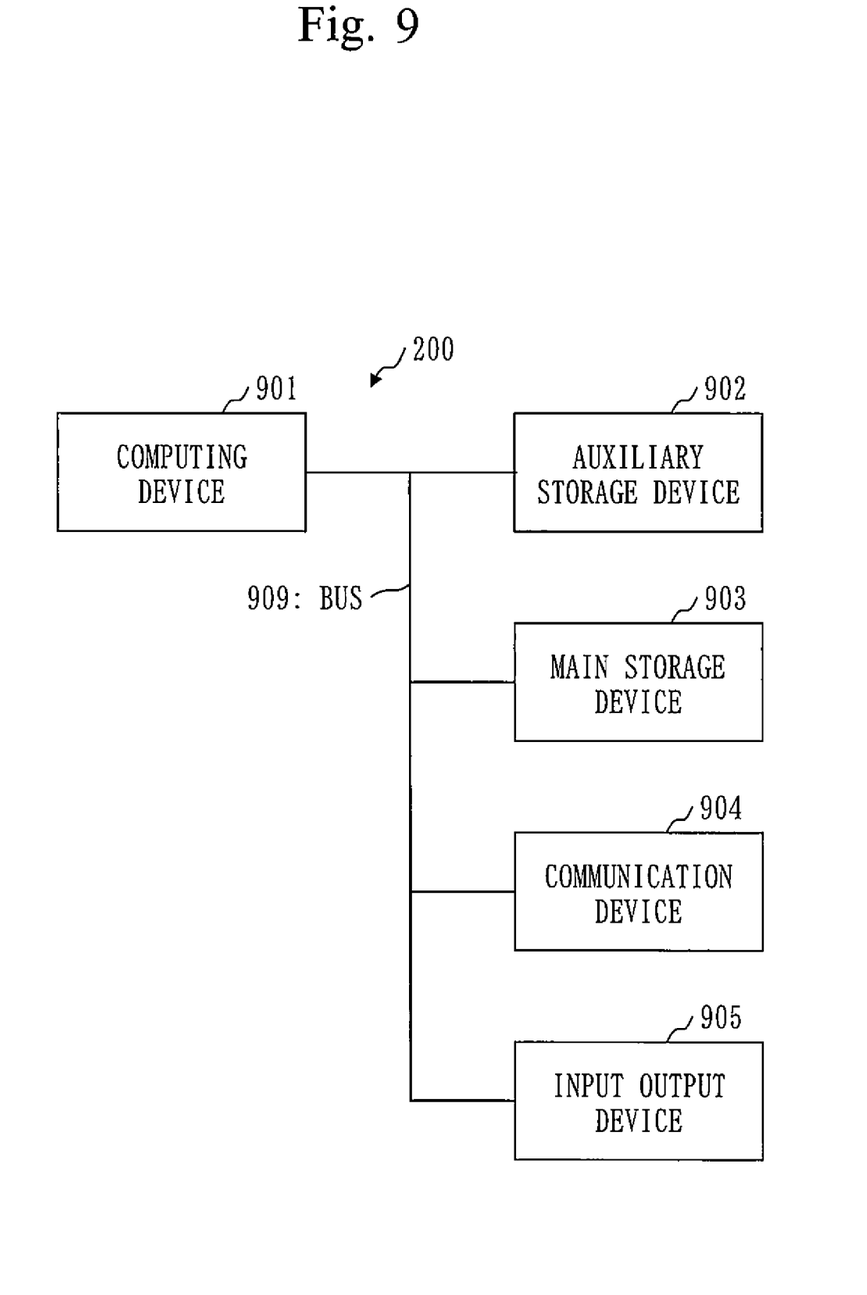
FIG. 9 is a diagram illustrating an example of a hardware configuration of the graph generation apparatus 200 according to the first embodiment.

FIG. 9 is a diagram illustrating an example of a hardware configuration of the graph generation apparatus 200 according to the first embodiment.

The example of the hardware configuration of the graph generation apparatus 200 according to the first embodiment will be described based on FIG. 9. The hardware configuration of the graph generation apparatus 200, however, may be in a configuration different from the configuration illustrated in FIG. 9.

The graph generation apparatus 200 is a computer which includes a computing device 901, an auxiliary storage device 902, a main storage device 903, a communication device 904, and an input output device 905.

The computing device 901, the auxiliary storage device 902, the main storage device 903, the communication device 904, and the input output device 905 are connected to a bus 909.

The computing device 901 is a CPU (Central Processing Unit) which executes programs.

The auxiliary storage device 902 is, for example, a ROM (Read Only Memory), a flash memory, or a hard disk device.

The main storage device 903 is, for example, a RAM (Random Access Memory).

The communication device 904 communicates via the Internet, a LAN (Local Area Network), a telephone network, or another network wiredly or wirelessly.

The input output device 905 is, for example, a mouse, a keyboard, or a display device.

The programs are usually stored in the auxiliary storage device 902, are loaded to the main storage device 903, read into the computing device 901, and executed by the computing device 901.

For example, an operating system (OS) is stored in the auxiliary storage device 902. In addition, programs that implement a function explained as a " . . . unit" are stored in the auxiliary storage device 902. Then, the OS and the programs that implement the function explained as the " . . . unit" are loaded into the main storage device 903, and executed by the computing device 901. The " . . . unit" may instead by read as " . . . process" or a " . . . procedure".

Information, data, files, signal values, and variable values indicating the results of processes that are explained as "conclusion of . . . ", "determination of . . . ", "extraction of . . . ", "detection of . . . ", "setting of . . . ", "registration of . . . ", "selection of . . . ", "generation of . . . ", "receiving of . . . ", "outputting of . . . ", and the like, are stored in the main storage device 903 or in the auxiliary storage device 902. In addition, other data used by the graph generation apparatus 200 are stored in the main storage device 903 or in the auxiliary storage device 902.

By the first embodiment, for example, advantageous effects such as those below are provided.

The graph generation apparatus 200 may generate the trend graph 121 (refer to FIG. 2) that includes the new graph 124 and the old graph 122.

The portion of the time period of the old graph 122 where the new graph 124 overlaps is displayed with a gradation. Therefore, it becomes easy to differentiate between the new graph 124 and (the overlapping portion of) the old graph 122. Furthermore, the overlapping portion and a part of the old graph 122 other than the overlapping portion are connected smoothly and the old graph 122 does not become obscure.

In other words, the graph generation apparatus 200 is able to generate a trend graph 121 which differentiates the new graph 124 from the old graph 122 and which enables easy comparison between the new graph 124 and the old graph 122.

The first embodiment is an example of an embodiment of the graph display system 100.

In other words, the graph display system 100 may not include some of the elements described in the first embodiment. The graph display system 100 may include an element not described in the first embodiment. For example, the graph generation apparatus 200 of the graph display system 100 may not include the graph display unit 260.

Processing steps described using a flowchart and the like in the first embodiment are examples of the processing steps of a method and the programs according to the first embodiment. In other words, the method and the programs according to the first embodiment may be implemented by a partly different processing step than the processing steps described in the first embodiment.

REFERENCE SIGNS LIST

100: graph display system, 101: numerical value data, 102: vector data 109: bitmap data, 110: external equipment, 120: LCD panel, 121: trend graph, 122: old graph, 123: gradation portion, 124: new graph, 200: graph generation apparatus, 210: numerical value data obtaining unit, 220: vector data generation unit, 230: vector data selection unit, 240: attribute value setting unit, 250: bitmap data generation unit, 260: graph display unit, 280: frame buffer, 290: apparatus storage unit, 291: numerical value file, 292: vector file, 293: graph range information, 294: gradation range information, 295: gradation type information, 901: computing device, 902: auxiliary storage device, 903: main storage device, 904: communication device, 905: input output device, 909: bus

The invention claimed is:

1. A graph generation apparatus comprising:
a processor to execute a program; and
a memory to store the program, past graph point group data, and new graph point group data, wherein
the past graph point group data represents, in chronological order, a plurality of graph points included in a past line graph,
the new graph point group data represents, in chronological order, a plurality of graph points included in a new line graph, and
the program which, when executed by the processor, results in performance of steps comprising,
selecting, as overlapping-portion data, graph point group data which represents a plurality of graph points included in an overlapping-portion graph, the overlapping-portion graph being a line graph of a time period of the past line graph where the new line graph overlaps, from the past graph point group data, and
generating graph image data that represents, as the overlapping-portion graph, a line graph in which a display style of the overlapping-portion data gradually changes along a time axis.

2. The graph generation apparatus according to claim 1, wherein
the past line graph is a graph of a past term expressed by a fixed length of time,
the new line graph is a graph of a time period of a first part of a new term expressed by the fixed length of time, and
the overlapping-portion graph is a line graph of a same time period as the first part of the time period of the past line graph.

3. The graph generation apparatus according to claim 1, wherein
the program results in performance of steps comprising,
generating, as the graph image data, image data that represents the new line graph and the past line graph which includes the overlapping-portion graph, based on the new graph point group data and the past graph point group data which includes the overlapping-portion data.

4. The graph generation apparatus according to claim 1, wherein
the program results in performance of steps comprising,
setting a first attribute value which signifies a first display style to graph point data at a first time point of the overlapping-portion data, and sets a second attribute value which signifies a second display style to graph point data at a last time point of the overlapping-portion data, and
generating the graph image data which represents, as the overlapping-portion graph, a line graph in which the display style changes gradually from the first display style to the second display style along the time axis based on the first attribute value set to the graph point data at the first time point and the second attribute value set to the graph point data at the last time point.

5. The graph generation apparatus according to claim 4, wherein
the program results in performance of steps comprising,
setting, as the first attribute value, a transparency degree value that represents a higher transparency degree than the transparency degree value of the graph point data at the last time point, to the graph point data at the first time point.

6. The graph generation apparatus according to claim 4, wherein
the program results in performance of steps comprising,
setting, as the first attribute value, a color value that represents a lighter color than the color value of the graph point data at the last time point, to the graph point data at the first time point.

7. The graph generation apparatus according to claim 4, wherein
the program results in performance of steps comprising,
setting, as the first attribute value, a weight value that represents a narrower line than the weight value of the graph point data at the last time point, to the graph point data at the first time point.

8. A graph display apparatus comprising:
a processor to execute a program; and
a memory to store the program which, when executed by the processor, results in performance of steps comprising,
displaying, based on past graph point group data representing, in chronological order, a plurality of graph points included in a past line graph, and new graph point group data representing, in chronological order, a plurality of graph points included in a new line graph, as an overlapping-portion graph, a line graph in which a display style of graph point group data gradually changes along a time axis, the graph point group data representing a plurality of graph points included in the overlapping-portion graph being a line graph of a time period of the past line graph where the new line graph overlaps.

9. A non-transitory computer readable medium having stored thereon past graph point group data, new graph point group data, and a graph generation program that when executed by a processor causes the processor to use the past graph point group data and the new graph point group data to perform
an overlapping-portion data selection process to select, as overlapping-portion data, graph point group data which represents a plurality of graph points included in an overlapping-portion graph, the overlapping-portion graph being a line graph of a time period of the past line graph where the new line graph overlaps, from the past graph point group data; and
a graph image data generation process to generate graph image data that represents, as the overlapping-portion graph, a line graph in which a display style of the overlapping-portion data gradually changes along a time axis, wherein
the past graph point group data is data that represents, in chronological order, a plurality of graph points included in a past line graph, and
the new graph point group data is data that represents, in chronological order, a plurality of graph points included in a new line graph.

10. A non-transitory computer readable medium having stored thereon a graph display program that when executed by a computer cause the computer to perform:

a graph display process that displays, based on past graph point group data representing, in chronological order, a plurality of graph points included in a past line graph, and new graph point group data representing, in chronological order, a plurality of graph points included in a new line graph, as an overlapping-portion graph, a line graph in which a display style of graph point group data gradually changes along a time axis, the graph point group data representing a plurality of graph points included in the overlapping-portion graph being a line graph of a time period of the past line graph where the new line graph overlaps.

* * * * *